E. E. TURNER.
CULTIVATOR ATTACHMENT.
APPLICATION FILED OCT. 28, 1919.

1,367,334.

Patented Feb. 1, 1921.

Inventor
E. E. Turner,
By
Attorney

UNITED STATES PATENT OFFICE.

EDWIN E. TURNER, OF SPUR, TEXAS.

CULTIVATOR ATTACHMENT.

1,367,334.   Specification of Letters Patent.   Patented Feb. 1, 1921.

Application filed October 28, 1919. Serial No. 333,882.

*To all whom it may concern:*

Be it known that I, EDWIN E. TURNER, a citizen of the United States of America, residing at Spur, in the county of Dickens and State of Texas, have invented new and useful Improvements in Cultivator Attachments, of which the following is a specification.

The object of the invention is to provide a relatively simple and efficient weed cutting and soil moving attachment for cultivators adapted to be applied to and used in connection with any suitable cultivator or plow beam or other device having a suitable draft appliance and designed to be used either singly or in duplicate as the conditions of operation may require, the blade or soil moving elements being capable of adjustment to produce the desired effect upon the ground with reference to the row of plants to be cultivated.

With these and related objects in view the invention consists in the construction and combination of parts shown in the accompanying drawing, it being understood that changes in form and proportion may be resorted to within the scope of the claims without departing from the principles involved.

Figure 1:
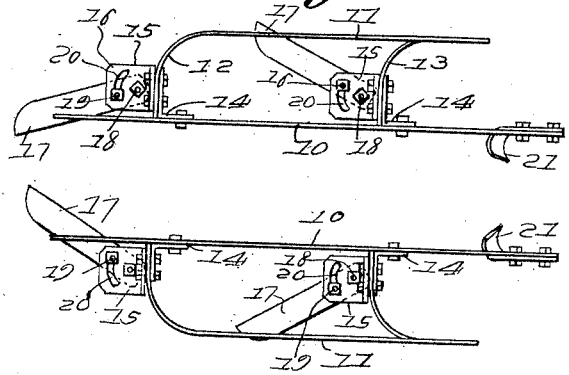
Figure 1 is a plan view of the attachment arranged in duplicate and thus adapted for operation simultaneously upon opposite sides of a row of plants.
Figure 2:
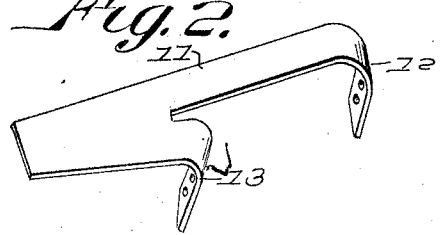
Fig. 2 is a detail view in perspective of the blade supporting member of the frame.
Figure 3:
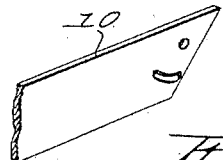
Fig. 3 is a detail view of the pivotal end of one of the blades.
Figure 4:
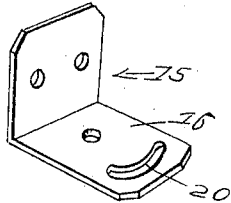
Fig. 4 is a similar view of one of the blade supporting brackets.
Figure 5:
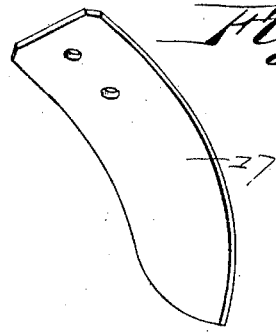
Fig. 5 is a similar view of one of the soil shifting blades.
Figure 6:
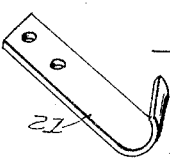
Fig. 6 is a similar view of one form of weed cutter.

The attachment is preferably constructed in duplicate or in right and left members for arrangement in relatively reversed positions upon opposite sides of any suitable supporting and draft appliance (not shown) such as a plow beam or the equivalent thereof and as the two members are identical in form with the exception of the necessary reversal to adapt them to operate upon opposite sides of the standing row of plants, a detail description of one will suffice to give a clear understanding of the complete apparatus. Each member consists of a frame having a supporting plate 10 to which is attached the blade supporting element 11 having forward and rear transverse arms 12 and 13 secured by angular braces 14 to the supporting plate and carried respectively by these arms are blade supporting brackets 15 having substantially horizontal wings 16 upon which are adjustably mounted the soil moving blades 17. In order that these blades may be interchanged and disposed at different angles to adapt them either to throw the soil toward the row or from the row or adapt them respectively to throw the soil toward and from the row in the progress of the mechanism, they are pivotally connected with the brackets as by bolts 18 and are secured in their adjusted positions by clamping means such as bolts 19 which engage slots 20 in the substantially horizontal wings of said brackets. As indicated in Fig. 1 the forward blade of the attachment is disposed to move the soil in one direction while the rear blade is disposed to move the soil in the opposite direction, but it will be understood that these relative positions may be reversed or that both blades may be arranged to move the soil in the same direction as for example when it is desired to hill a row, and carried by the supporting plate preferably in advance of the forward blade is a weed cutting element 21 designed to project inwardly beyond the plane of the supporting plate as shown in Fig. 1, it being understood that the form of this blade may be modified as required by the conditions under which the mechanism is to be used. The operation of this weeding blade also serves to loosen the soil in advance of the blades so as to facilitate the lateral movement thereof by the blades in the cultivation of the row.

It will further be understood that as the members of the attachment are so constructed that the various elements thereof are connected with a common supporting frame, the attachment may be applied as a unit to any suitable or convenient plow beam or wheeled frame without necessitating any modification in the construction of the latter.

What is claimed is:

1. A cultivator attachment having a supporting frame consisting of a plate and a substantially parallel element provided with lateral arms spanning the interval between said frame and the plate, and soil moving blades carried by said arms in tandem relation to the direction of movement.

2. A cultivator attachment having a supporting frame provided with transverse front and rear bracket carrying elements and soil moving blades adjustably mounted respectively upon said brackets in tandem relation to the direction of movement of the attachment.

3. A cultivator attachment having a supporting frame, front and rear brackets carried by the frame, soil moving blades pivotally mounted respectively upon said brackets, and adapted for independent outward and inward swinging movement relative to the direction of movement of the attachment, and clamping means for securing said blades in their adjusted positions.

4. A cultivator attachment consisting of a supporting plate having a parallel element provided with front and rear arms secured to said plate, brackets carried respectively by said arms between the planes of said plate and the element carried thereby, blades pivotally mounted upon said brackets for swinging movement laterally with relation to the direction of movement of the attachment, and means for securing said blades in their adjusted positions.

In testimony whereof I affix my signature.

EDWIN E. TURNER.